United States Patent
Brobeck et al.

[15] 3,692,090
[45] Sept. 19, 1972

[54] METHOD OF MAKING A VENTED TIRE MOLD

[72] Inventors: Von H. Brobeck; Mike Zulick, both of Akron, Ohio

[73] Assignee: The Goodyear Tire & Rubber Company, Akron, Ohio

[22] Filed: July 20, 1970

[21] Appl. No.: 56,566

Related U.S. Application Data

[60] Division of Ser. No. 871,585, Nov. 10, 1969, Pat. No. 3,553,790, which is a continuation of Ser. No. 611,327, Jan. 24, 1967.

[52] U.S. Cl. ............... 164/71, 18/42 T, 18/DIG. 62, 164/98, 164/76, 164/111, 164/410, 29/527.6, 29/DIG. 46, 264/71
[51] Int. Cl. ............................................. B23k 19/00
[58] Field of Search ....18/42 T, 44, DIG. 62; 164/98, 164/100, 108, 111, 137, 410, 71; 264/71; 29/527.6, DIG. 46; 25/41 J

[56] References Cited

UNITED STATES PATENTS

| | | |
|---|---|---|
| 1,931,649 | 10/1933 | Eger ................... 18/DIG. 62 |
| 2,198,497 | 4/1940 | Hagemeyer ........... 18/DIG. 62 |
| 2,587,297 | 2/1952 | Duerksen ................ 18/44 |
| 2,629,897 | 3/1953 | Mahla ................... 18/2 RC |
| 3,377,662 | 4/1968 | Fukushima ............... 18/38 |
| 3,467,988 | 9/1969 | Zaffaroni et al. ........ 264/71 X |

Primary Examiner—John F. Campbell
Assistant Examiner—Donald C. Reiley, III
Attorney—F. W. Brunner and Robert S. Washburn

[57] ABSTRACT

A method of enhancing the air escape flow capacity of a vented tire mold wherein the tire receiving cavity is fabricated by casting molten material around a design-forming preform providing with at least one air escape passage. The venting capacity of the mold is increased by causing the perform to become slightly loosened from the mold body. The flow capacity may be further enhanced by etching the surfaces of the provided air escape passage in order to enlarge same.

The foregoing abstract is not to be taken as limiting the invention of this application, and in order to understand the full nature and extent of the technical disclosure of this application reference must be made to the accompanying drawing and the following detailed description.

3 Claims, 6 Drawing Figures

PATENTED SEP 19 1972 3,692,090
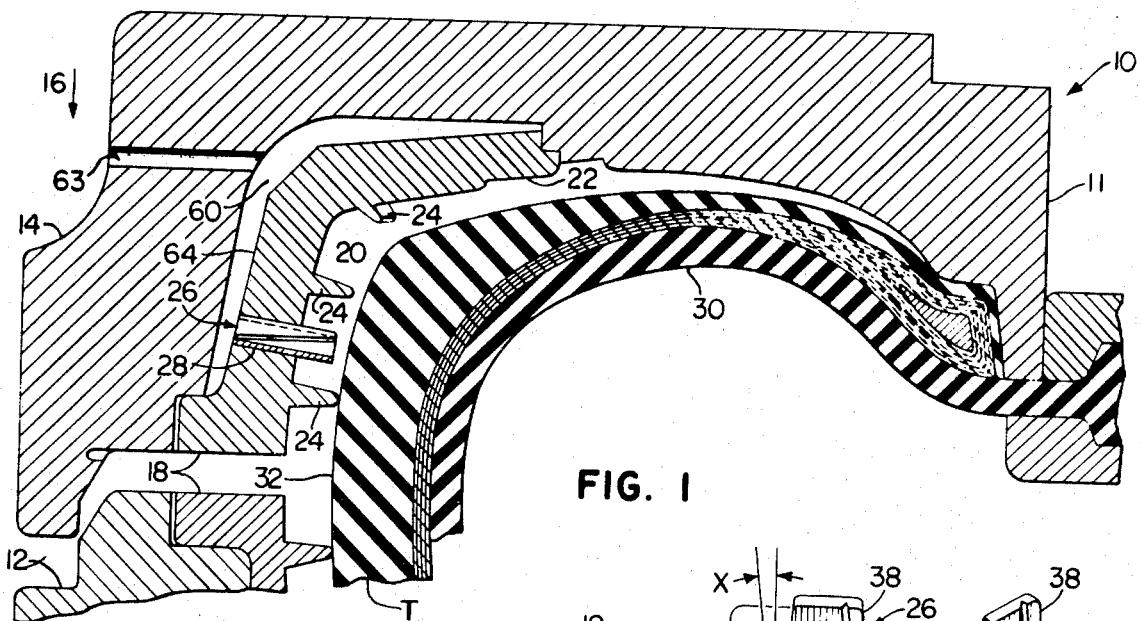
FIG. 1
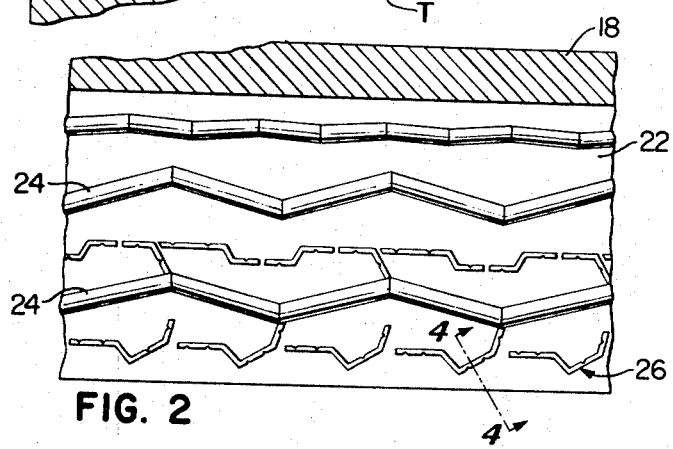
FIG. 2
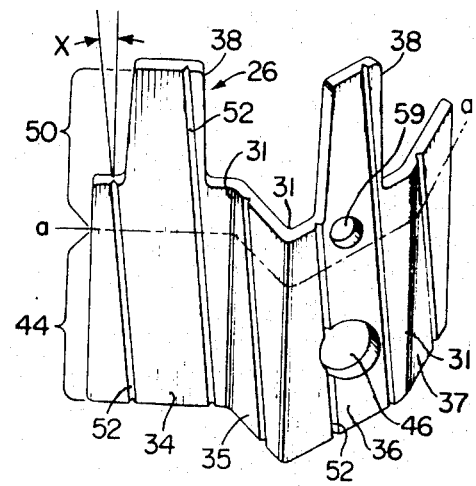
FIG. 3
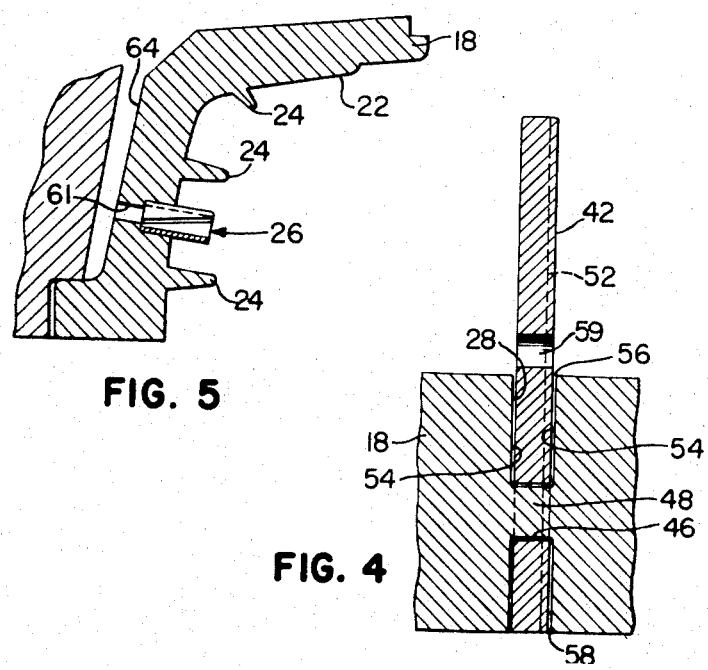
FIG. 5
FIG. 4
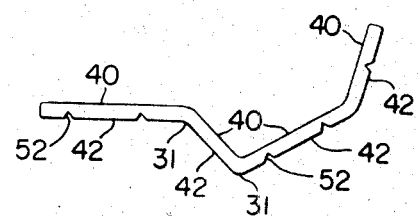
FIG. 3A
INVENTORS
VON H. BROBECK
MIKE ZULICK
BY R.S. Washburn
AGENT

METHOD OF MAKING A VENTED TIRE MOLD

This application is a division of application Ser. No. 871,585, filed Nov. 10, 1969, now U.S. Pat. No. 3,553,790, which application was a continuation of application Ser. No. 611,327, filed Jan. 24, 1967.

Heretofore, in order to release air from between the surfaces of a mold cavity and an uncured tire body as that body is expanded into the mold for curing, it has been necessary to provide a multitude of small holes in the walls of the mold. The molding and curing process subjects the tire body to heat and pressure such that the small holes, called vents, tend to fill with rubber which is then cured with the tire. When removed from the mold the cured tire carries on its surface numerous small diameter projections or protrusions extending as much as three-eighth inch to one-half inch, the removal of which is expensive and time consuming; when not removed with the tire the small projections remain to plug the holes in the mold, from which they must periodically be removed. These protrusions, also often called vents, have long plagued manufacturers of tires. Their removal is seldom complete and is always expensive.

It is a primary object of the present invention to provide means for the escape of trapped air from a tire mold while preventing or at least minimizing the formation of objectionable protrusions of tire material from the surfaces of a cured tire.

Other objects will be in part obvious, and in part pointed out more in detail hereinafter.

The objects and advantages of the invention are achieved in certain preferred embodiments which are herein shown and described with reference to the accompanying drawing in which:

FIG. 1 is a partial cross-sectional view of a tire mold embodying the invention, FIG. 2 is a diagramatic representation of the interior of the tire mold of FIG. 1, FIG. 3 is an enlarged perspective view of a design forming element according to the invention, FIG. 3A is a cross-sectional view of the element of FIG. 3 generally as indicated by the line $a$—$a$ in FIG. 3.

FIG. 4 is an enlarged sectional view, taken generally as indicated by line 4—4 of FIG. 2.

FIG. 5 is a partial cross-sectional view of an alternative form tire mold, incorporating the invention.

In the drawing, and particularly in FIG. 1, a tire mold 10 the body 11 of which includes a lower half 12 and an upper half 14 is shown in the transverse cross-section. The upper half 14 is shown in a position just prior to its full engagement with the lower half 12 as the former moves in the direction indicated by the arrow 16 into the closed position of the mold 10. Each mold half includes a tread ring 18 which is an aluminum casting extending all the way around the circular mold and which is seated in its respective mold half to become a part of the mold body 11. The mold halves 12, 14 define a tire receiving cavity 20. Extending inwardly of the cavity from the tire engaging surface 22 are a plurality of circumferential ribs 24 which are cast as integral parts of the tread ring 18 and which engage the uncured tire T to form generally circumferential grooves in the cured tire. In addition to the ribs 24 integrally formed, other design forming elements 26 are embedded, or inserted, in recesses 28 in the tread ring 18 which open into the mold cavity 20 and which form other grooves or indentations as a part of the tread pattern.

It will be apparent, making reference to FIG. 1, that, as the tire T is expanded by the action of fluid pressure within the bladder 30 to fill the mold cavity 20, the outer surface 32 of the tire first makes full contact with one of the circumferential ribs 24 thereby entrapping a considerable volume of air between the mold cavity surface 22 and the tire surface 32. The air so trapped, if not vented to the outside of the mold, remains to prevent the uncured tire from filling the mold completely; the resulting tire then will be imperfect wherever such air has prevented the surface 32 from coming into complete contact with the mold cavity surfaces.

The total cross-sectional area of air escape passages required for satisfactorily venting a rapidly closed tire mold needs to be quite large, yet in accordance with the invention each individual passage is sufficiently small, at least in one dimension; i.e., a width of less than about 0.005 inch, that rubber tire material can enter only slightly, if at all, into the individual passages. While individual passages are described herein, it will be understood that tire molds in accordance with the invention are provided with a large number, even several hundred of such passages as will be described, thus accommodating the rapid escape of air from the mold cavity 20.

In FIG. 2 a representative portion of the cavity of the tire mold of FIG. 1 is shown, including the several circumferential ribs 24 and an array of design forming or blading elements 26 which are inserted in recesses formed by the elements 26 themselves being cast-in-place in the tread ring 18. The particular geometric configurations and arrangement of the ribs 24 and of the blades 26 which are shown will be understood to be merely by way of example and to be subject to variation to suit the purpose of the tire designer.

The blade 26 shown in FIGS. 3, 3a and 4 is representative of the type of tire mold insert which is made a part of the tire mold 10 by being lodged in the tread ring 18 when the ring is cast. The blade 26 is a strip of suitable hard material, a metal such as stainless steel being preferred, for use with the cast aluminum of the tread ring. The strip is formed, by bending at bend lines 31 generally parallel to the height of the blade 26, to make several panels 34, 35, 36 and 37, certain of which; e.g., panels 34 and 36 have tabs 38 extending upwardly from the panels. (For convenience in description the term height is used herein to mean the extent of the blade radially inward and outward with respect to the mold cavity surface 22, which extent is shown vertically in FIG. 3.) The adjacent panels 34, 35, 35, 36, 36, 37 are disposed at predetermined angles with one another to form suitable designs in the tire. Each panel, and the blade 26 itself, has two plane generally parallel and opposed surfaces 40 and 42. A suitable blade may, of course, have any number of panels.

The blade 26 is secured in a master pattern (not shown) so that when the tread ring 18 is cast, the molten, or fluid, material surrounds the lower portion 44 of the blade to a height indicated by the line $a$—$a$. As may be seen in FIG. 4, the blade includes a locking hole 46 through which molten metal flows freely to form, when solidified, a lock pin or tie 48 which serves to anchor the blade 26 securely within its seat or recess. The remaining or upper portion 50 of the blade 26, including the tabs 38, is exposed within the tire receiving cavity 20 so that its shape can be impressed in the tire T.

We have discovered that air escape means or vents can be very satisfactorily provided by a sufficient number of narrow generally parallel grooves 52 in either or both of the plane surfaces 40, 42 of the panels of the blade 26.

For example, with blade elements 26 of stainless steel and having such narrow grooves 52 inserted in a tread ring 18 cast of conventional aluminum alloy, the grooves 52 being not more than about 0.005 inch width remain at least partially open so as to permit a free flow of air through the passages formed between the grooved surface 42 including the grooves 52 and the facing wall of the recess 28 in the ring 18. Without asserting or being limited to a particular theory, we attribute to the surface tension and viscosity of the aluminum, as cast, the fact that the aluminum does not enter and fill such narrow groove, but instead bridges this width so as to provide the vent passages described. Thus the surface 42 of the blade or design forming element 26 cooperates with adjacent and oppositely facing wall 54 of the recess 28 in which the blade 26 is seated to provide one or more air venting passages which are open at one end 56 into the mold cavity 20 and at the other end 58 to any convenient space, such as the space or annulus 60 or the circumferential groove 61, which is in open flow communication with the air outside the mold, as through the hole 63. Moreover, the passage entry or open end 56, bounded by the surface 42 of the blade and the recess wall 54 at the cavity surface 22 is so narrow; i.e., less than about 0.005 inch, that rubber tire material is prevented or at least impeded from entering the passage, yet the venting or flow area of the passage is sufficient to allow a proportionate escape of air, or in other words passages so provided in the large number of blades in the mold allow all the air to escape at a rate which permits the desirably rapid closure of the mold 10.

To enhance the effectiveness of the totality of the vents provided in a mold according to the invention, we provide also an air hole 59 (FIG. 3) through which air can flow to the nearest vent passage or groove thus tending to maximize the total air escape flow rate, and sufficiently venting the cavity 20 at either side of the blade.

We have found it advantageous also to form the grooves 52 at a small angle x with respect to the length, or height, of the blade 26, particularly with blades having more than one panel, so that such grooves do not lie parallel to or coincident with the bends 31 in the strip material forming the blade. This avoids weakening and possibly breaking of the blade along the lines of its bends.

We have also discovered that tread design elements such as the blades 26 can be slightly loosened in the recesses in which they are seated, by impact, or vibration, sufficiently to enlarge the recess 28 slightly. For example, we found, in the machining of a tread ring 18 along its outer circumference 64, or in the machining of the circumferential groove 61 opening into space 60 according to FIG. 5, that the successive impacts of the cutting tool in motion across the ends 58 of the blades slightly loosened each of the blades 26 within their recesses 28 so that venting air flow capacity appeared to be improved over that of the previously described grooves alone. Without asserting or being limited by a particular theory, we attribute the apparently increased capacity to the opening of some small spacing between the plane surfaces 40, 42 of the blade 26 and the confronting wall faces 54 of the recess 28 in which the blades 26 are lodged in the tread ring 18, nevertheless the blades 26 themselves were entirely secure against premature or accidental removal because of the tie 48 extending through the locking hole 46 from one to the other wall 54, 54 of each recess 28.

Other methods for forming venting passages along the surface of a blade and the confronting wall surface of the recess in the mold in which the blade is seated are contemplated as being within the purview of the instant invention. For example, with blades 26 seated in the ring 18 being rapidly heated to about 1,000° F., the mold ring 18 itself being heated only indirectly, by direct electric resistance heating of the blades, the blades are each expanded within their respective recesses. The relatively softer aluminum of the ring 18 is displaced slightly by the rapid expansion of the blade 26 so that the surfaces 42, 42 of the blade are slightly spaced from the adjacent, opposite, confronting walls 54 of the recess to provide the desired vent passages.

In the machining of the tread ring as described, the ends 58 of the blades 26 and the outer ends of the associated air escape passages may become partly or wholly covered by a thin layer of metal, sometimes described and referred to as smear metal, which is displaced into the passage openings by the action of the cutting tool. Removal of such smear metal to ensure that the air escape passages are not obstructed thereby is accomplished most conveniently by exposing the groove 61 or the outer surface 64 of the tread rings at the outer ends of the blades to an electrochemical etching process well known in the electro-plating arts. Either the blade material or the tread ring material may be etched away by the selection and use of appropriate etchants. We prefer to use a process which attacks the stainless steel blades rather than the aluminum of the ring, so as to maintain the desired dimension and fit of the tread rings in the mold. The outer end part of the passage, remote from the cavity, is enlarged slightly by the etching process which seems further to enhance the air escape flow capacity of the passages.

It is thus apparent that we have provided a tire mold which is satisfactorily vented by means on an insert, or design forming element, which cooperates with means in the tire mold body to provide an air escape passage which is open at one end into the tire receiving cavity of the mold and at its other end is in open gas flow communication with the atmosphere outside the mold, whereby air entrapped between the tire molding cavity and a tire to be molded will escape from the cavity to the outside atmosphere.

The vented tire mold according to our invention has marked advantages, particularly in the reduction or elimination of the undesirable projections from the surface of the cured tire. By locating the vent passage opening 56 at the juncture of the design forming element, or blade 26, with the peripheral surface 22 of the cavity 20 and by providing the opening 56 with a cross-section sufficiently narrow to impede the entry of the rubber tire material into the passage, we effectively conceal the vents of the tire mold. Use of our mold has the further advantage of reducing or eliminating the cost of trimming or removing projections from the cured tires produced; yet the vents provided by our invention have ample capacity in the large number of blades or elements for the escape of air to allow for the rapid closing of the mold.

Our invention has the further advantage of obviating the necessity for the normally expensive and generally unsatisfactory operation of drilling a large number of holes of the smallest practicable size for venting into the mold body. In accordance with our invention each blade, or other design forming element 26, is provided with grooves 52, or is slightly loosened within its recess 28, or both, so that adequate air escape vents are provided between one or more of the faces 40, 42 of the element and the confronting, or mating, faces 54, 54 of the recesses 28 in the mold 11, 18 in which the elements are seated. Inasmuch as the rubber tire material is substantially prevented from entering the air escape passages because of their small width, the cost and effort heretofore expended in cleaning and reopening conventional vents is largely eliminated.

While certain representative embodiments and details have been shown for the purpose of illustrating the invention, it will be apparent to those skilled in this art that various changes and modifications may be made therein without departing from the spirit or scope of the invention.

What is claimed is:

1. In a method of making a vented tire mold having a body provided with a tire receiving cavity including the steps of casting fluid material to form the body, flowing the fluid material around a design forming element, and solidifying the material to retain said element in the solid body, the improvement comprising forcing relative movement of the element with respect to the solid body whereby said element becomes slightly loosened from the body to provide an air escape passage of increased escape flow capacity between said element and said body.

2. In a method according to claim 1, the improvement wherein the step of forcing relative movement comprises vibrating the element by successive impacts thereagainst.

3. In a tire mold according to claim 1 the further improvement comprising etching at least one of the surfaces of the air escape passage provided by said element and said body whereby the end of said passage remote from said cavity is enlarged.

* * * * *